July 21, 1942.  W. A. ARNESEN  2,290,665
DIAGNOSTIC INSTRUMENT
Filed May 6, 1937  3 Sheets-Sheet 1

INVENTOR.
Walter A. Arnesen
BY Ramsey, Kent, Chisholm and Lutz
his ATTORNEYS

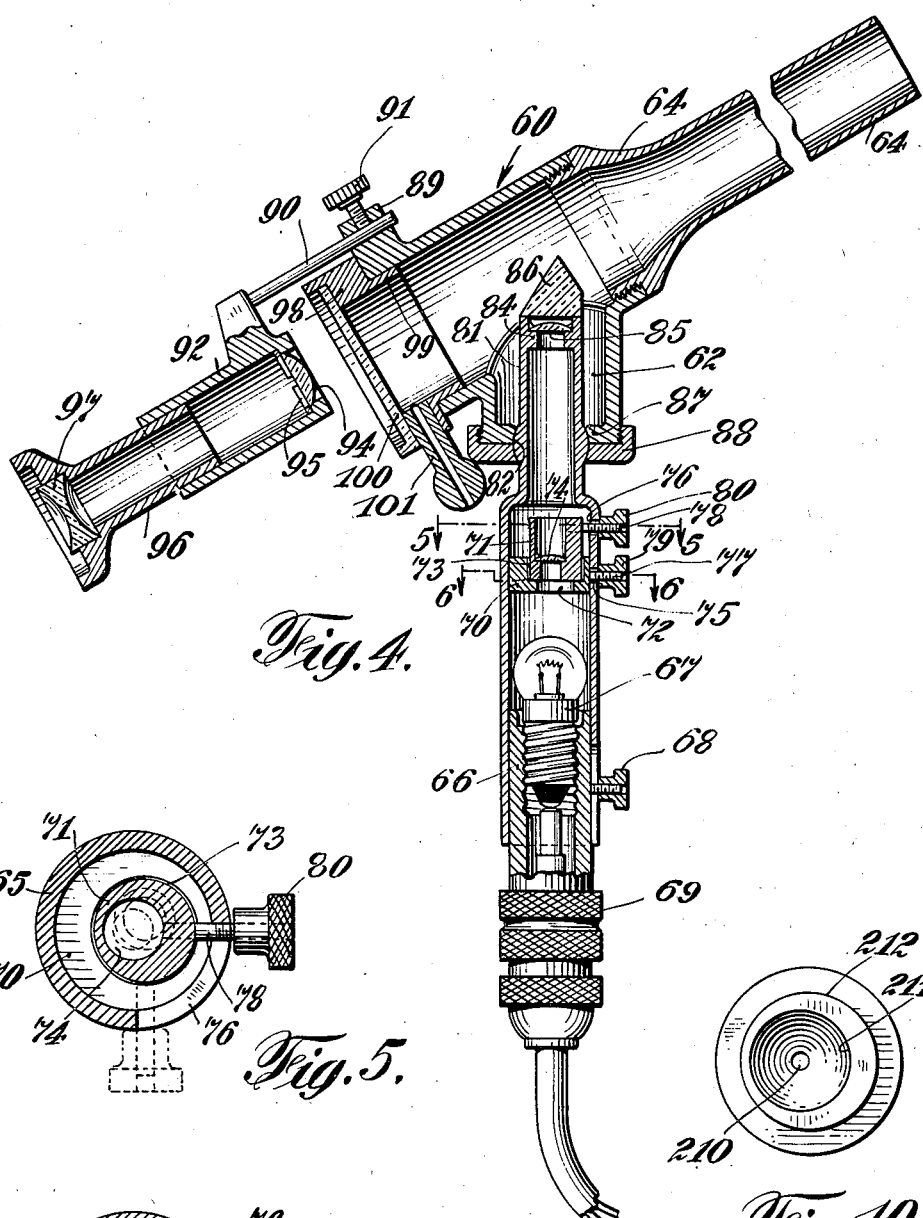

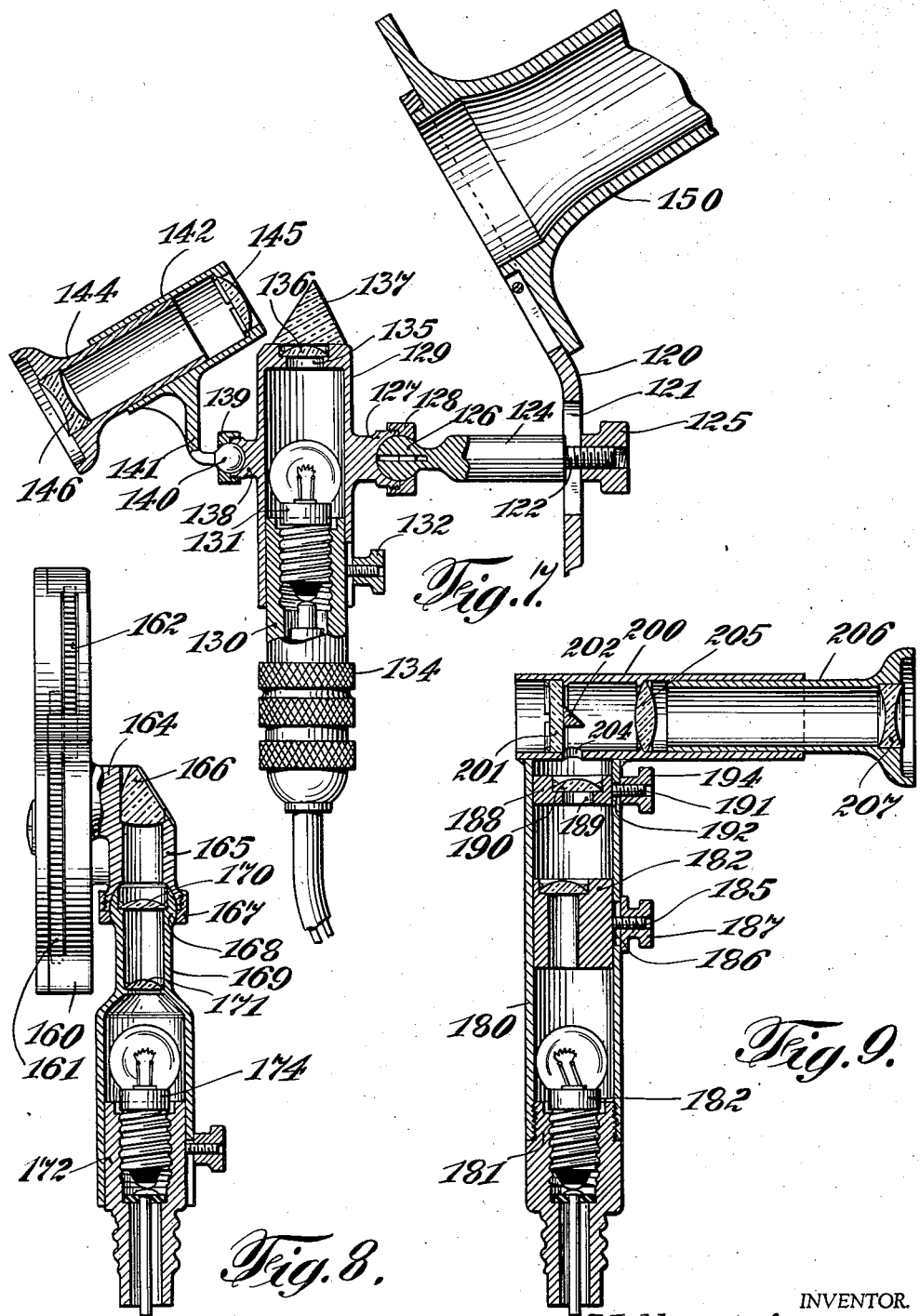

Patented July 21, 1942

2,290,665

UNITED STATES PATENT OFFICE 2,290,665

DIAGNOSTIC INSTRUMENT

Walter A. Arnesen, New York, N. Y.

Application May 6, 1937, Serial No. 141,079

13 Claims. (Cl. 128—6)

This invention relates to improvements in diagnostic instruments and more particularly to improvements in such instruments utilizing ordinary flash-light bulbs as sources of light rays.

Heretofore some difficulty has been experienced in the use of flash-light bulbs as sources of light rays for diagnostic instruments for the reason that the filaments of such bulbs are not always symmetrically disposed relative to the bulb base. Accordingly in instruments wherein the bulbs are held in fixed position it oftentimes follows that the rays of light therefrom (which usually pass through condensing lenses and/or light bending devices) will cause the directed rays to be moved along an axis out of register with the desired axis.

An object of the present invention is to provide diagnostic instrument construction in which means are provided for compensating for any dissymmetry in filament position relative to the associated base.

Another object of the invention is to provide instrument construction in which the light carrying and directing member is capable of wide adjustment relative to a speculum support.

Another object of the invention is to provide instrument construction in which means are provided for causing the light rays from a fixed bulb to be projected along a desired axis regardless of the position of the filament of the bulb.

A further object of the invention is to provide an instrument construction incorporating adjustment means whereby an instrument can readily be adjusted to be used as an adjunct in operating practice as well as in diagnosis.

In carrying out the foregoing and other objects of the invention one form thereof is incorporated in an instrument wherein a light carrier is connected by means of universal joints to a handle having a speculum holder as part thereof. This arrangement permits adjustment of the light carrier to any desired position relative to the handle. The light carrier has a socket for a flash-light bulb or the like together with a light bending member which can be adjusted relative to the socket to project rays at any desired angle relative to the axis of the socket. In addition the carrier may have incorporated therewith a condensing lens mounted for rotation about any of a plurality of selected axes crossing the axis of the light bulb.

As an embodiment of this form of the invention it is contemplated that a light carrier can be connected by the same universal joints to a spring clip member, which member can be readily secured to or removed from the peripheral flange of the speculum to thereby produce a readily assembled instrument.

In another form of the invention a light carrier is so associated with the casing of a speculum holder that a part of the carrier extends into the casing through an adjustable ball-like joint whereby the axis of light rays projected by a light bending member at the end of the carrier can be varied at will. Mounted within the carrier is an eccentric lens arrangement adapted for use as a compensating arrangement to compensate for any dissymmetry in light bulb filament position.

In a further form of the invention a light carrier is connected to a handle, having a speculum holder at one end thereof, by means of a swivel joint and in addition the carrier has secured thereto an inspection lens arrangement. This inspection lens arrangement preferably is secured to the carrier by means of a swivel joint. Due to this arrangement it is possible to adjust the carrier to any position desired for the projection of light rays and at the same time the inspection lens arrangement may also be adjusted to any desired position relative both to the carrier and to the speculum holder.

In a further form of the invention an optical dioptric instrument has a light bending member rigidly secured thereto. A light carrier is swivelly secured to the mount for the light bending member so that dissymmetry of light bulb filament position can be compensated for to cause the rays to be projected along the proper axis.

In a still further form of the invention an optical dioptric instrument is made up to incorporate a telescopic lens arrangement whereby various dioptric values of inspection lenses can be acquired. Associated with this mechanism is a light bulb carrier with a socket so disposed that light rays therefrom should normally impinge upon and be directed from a prism in line with the inspection lens arrangement. An eccentric lens arrangement is included in the light carrier to provide the compensation heretofore described.

In a still further form of the invention a speculum is so made that the opening therethrough can be mounted eccentrically relative to a support and can be rotated relative to the support to acquire adjustment thereof relative to a source of light rays and an inspection lens arrangement.

Other features, objects and advantages of the invention will become apparent by reference to the following detailed description of the accompanying drawings illustrating the same wherein:

Fig. 4 is a vertical section of a modification of the invention;

Fig. 5 is a section taken substantially on the line 5—5 of Fig. 4;

Fig. 6 is a section taken substantially on the line 6—6 of Fig. 4;

Fig. 7 is a vertical section, partially fragmentary, of a further modification of the invention;

Fig. 8 is a side elevation, partially in section of a further embodiment of the invention;

Fig. 9 is a vertical section of a still further embodiment of the invention;

Fig. 10 is an end view of an improved speculum which can be utilized for obtaining the benefits of the invention.

Figures 1, 2:
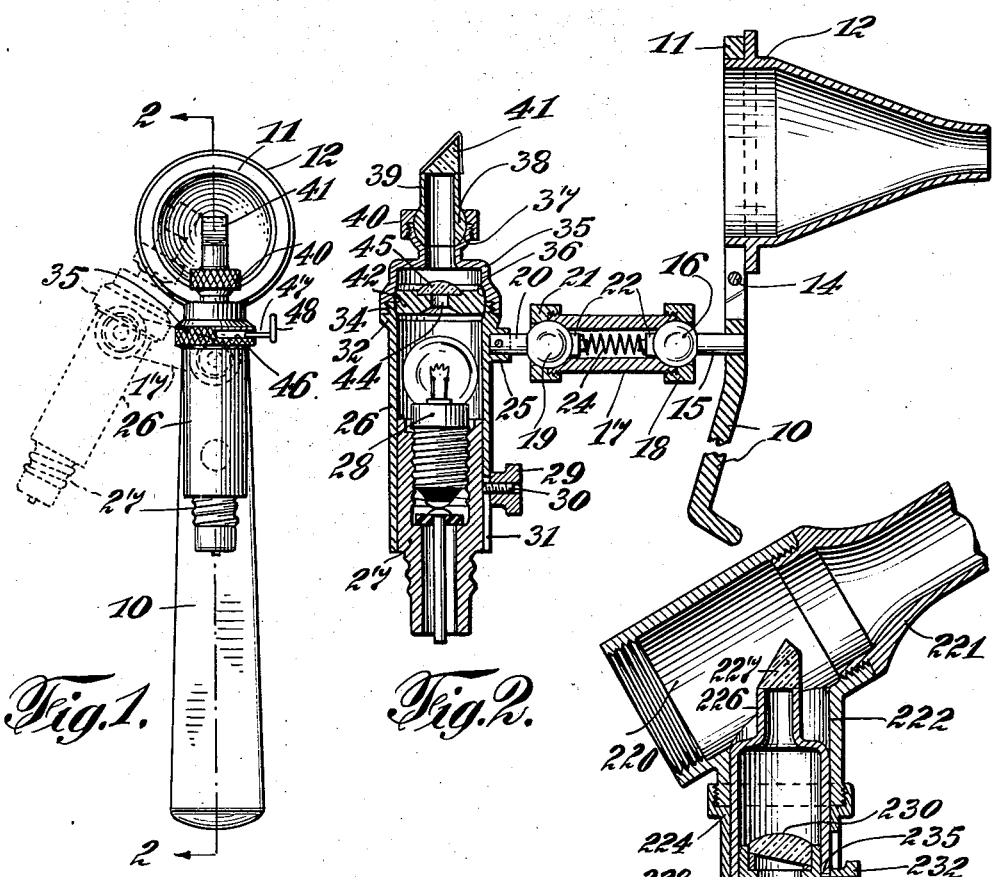
Fig. 1 is an elevation of an instrument embodying the invention.
Fig. 2 is an enlarged section taken substantially on the line 2—2 of Fig. 1.

Referring now to the drawings and particularly to Figs. 1 and 2; 10 indicates a handle preferably made in the shape of a flat blade-like device having rounded edges. Secured to the upper end of the handle 10 is a socket 11 for the reception of a speculum 12. This socket, following conventional practice is expansible and can be contracted to lock the speculum in place by means of a set screw, a section of which is shown at 14.

Extending outwardly from the handle 10 is a stem member 15, the end of which is shaped in the form of a ball 16. A tubular member 17 has one end thereof rounded for the reception of the ball 16 and is externally threaded for the reception of a locking member 18; whereby an adjustable ball joint is provided. The other end of the tubular member 17 is of identical construction to receive a ball 19 on the end of a stem 20, which ball is locked in place by a member 21 similar to member 18. Followers 22 rest against the receptive balls 16 and 19 and are pressed thereagainst by a spring 24 with force sufficient to provide such friction as to aid in holding the parts in adjusted position until the same can be locked.

The other end of the stem 20 is secured in a hollow boss 25 extending from a substantially tubular member 26. A socket member 27 for the reception of a light bulb 28 is secured within the tubular member 26 in an adjustable fashion by means of a nut 29 threaded onto a threaded stem 30 extending through a longitudinal slot 31 in the member 26. By this arrangement the socket 27 and bulb 28 may be locked in a number of positions longitudinally of the member 26. The upper end of the member 26 is provided with an external shoulder 32 and is externally threaded immediately above such shoulder. The inner surface of the upper end of the member 26 is rounded on an arc of relatively large radius as indicated at 34. Secured to the upper end of member 26 is a connector 35 having an inner surface 36 of a curvature corresponding to the curvature 34. The upper end of connector 35 is rounded out as indicated at 37 for the reception of a ball-shaped end 38 of a lens mount 39. The exterior of the tube 37 is externally threaded for engagement to lock member 40 which cooperates with the part 37 and ball 38 to form a ball joint. The lens secured to this mount is in the nature of a prism 41 so constructed as to direct and bend light rays at an angle of 90 degrees.

A lens mount 42 in the shape of a disc has the peripheral edge thereof formed on the same arc as that upon which the surfaces 34 and 36 are formed, so that this mount can fit snugly in a retainer made up of the composite formation provided by these two surfaces. An aperture 44 is provided centrally of this mount and a condensing lens 45 is fastened in some suitable fashion coaxially with such aperture. A part of the connector 35 is cut away to provide a slot 46 through which extends a handle 47 secured to the mount 42. An angular extension 48 on the handle facilitates manipulation thereof.

The operation and use of this embodiment of the invention is substantially as follows:

Assuming that a speculum 12 has been secured in the speculum handle and that the device is to be used for diagnostic or operating purposes, the interior of the speculum and a portion of the body of a patient may be illuminated by means of the light bulb 28. Since flash-light bulbs so called, are made on a production scale, it follows that the filament of such bulbs may not, in all cases, be disposed exactly symmetrically relative to the base of the bulb. When such dissymmetry occurs it follows that the light rays projected by a light bending device such as the prism 41 may not be projected on an axis at 90 degrees to the top portion of the member 26. Accordingly assuming that the light bending member is normally held in such position that the axis of the projected rays do not coincide with the axis of the speculum, compensation may be made to correct any variation in such coincidence which variation may be caused by the before-mentioned dissymmetry. The instrument shown in Figs. 1 and 2 provides at least three arrangements for securing such compensation and such arrangements may be used severally or collectively. For example, should the filament be off-center sufficiently to cause the light rays projected by the prism 41 to be along an axis diverging upwardly from the axis of the speculum, compensation for such divergence and consequent attainment of coincidence of axes can be obtained by manipulation of the two ball joints incorporated in the connection between the handle 10 and the member 26. Such adjustment can be made until the member 26 carrying the prism has been in effect moved clock-wise until the axis of the form upwardly diverging rays has been brought into coincidence with the axis of the speculum. The device can be locked in such adjusted position.

As a second compensation arrangement, let it be assumed that the same conditions formerly set forth occur. Such error can be rectified by movement of the lens mount 42 within its socket, which movement can be produced by a proper manipulation of the handle 47. Due to the provision of the slot 46 this handle, and consequently the lens mount, can be moved about the axis of the tubular member 26 and also can be moved about one or more axes crossing the axis of the member 26. Thus proper adjustment of this lens mount 42 and the lens 45 carried thereby will serve to cause light rays from the bulb 28 to strike the prism 41 at such an angle that the rays projected from the prism will be along an axis coinciding with the speculum 12.

A still further compensation can be made by adjusting the lens mount 39 in its ball joint relative to the tube member 26 and the connector 35. Should the rays be projected upwardly to an undesired extent, this mount 39 can be moved in a clock-wise direction to bring the axis of the projected rays into coincidence with the axis of the speculum and when such adjustment has been made the mount can be locked in place by the component part 40 of the ball joint.

It will be apparent that these parts may be used as before-mentioned severally or collectively to provide the desired adjustment thereof, and in addition this form of the invention provides the feature of adjustment of parts to permit illumination of the areas to be treated, while at the same time providing access to such areas for the introduction and use of operating instruments through the speculum. The member 26 and the parts in longitudinal relation thereto can be moved as a unit from the full line position shown in Fig. 1 to any one of a plurality of adjusted positions, an example of which is indicated by the dotted line position of Fig. 1. When this unitary construction has been moved to an adjusted position the light bending member or prism can be so positioned relative to the light bulb as to direct rays into the orifice of the speculum while the prism is out of register with the axis of the speculum. Consequently, free access to the orifice of the speculum is provided and thereby the introduction of an operating instrument through this speculum orifice to a surface to be treated is facilitated.

Figure 3:
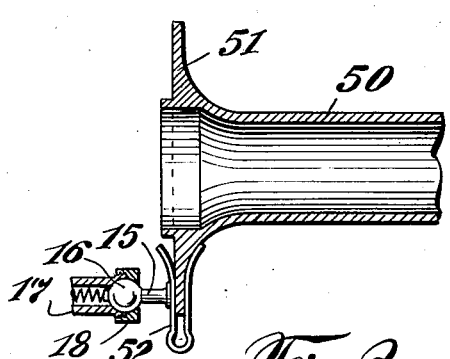
Fig. 3 is a fragmentary section of a modification of the device shown in Fig. 2.

A modification of this arrangement has been illustrated in Fig. 3. It is well-known in the art that certain speculum, particularly of large diameter, are provided with peripheral flanges which extend beyond the normal periphery of the speculum a considerable distance. This arrangement is illustrated by the fragmentary speculum 50 which has a peripheral flange 51. In this modification of the invention the stem 15 of Fig. 2 instead of being secured to a handle 10 is secured to a spring clip 52. This clip 52 can be engaged with the flange 51 with sufficient friction as to hold the light carrying parts to the speculum in which position the adjustments previously described can be made. The remaining parts of this embodiment are similar to those previously described.

In the form of the invention shown in Figs. 4 to 6 inclusive, use is made of a housing indicated generally at 60 which housing has a substantially tubular bore 61 with an angular off-set bore portion 62. One end of the housing serves as a receptacle for a speculum 64 which can be secured in place by threads or by any other suitable means. In conjunction with this housing use is made of a tubular member 65 in which is slidably secured a light socket 66 carrying a light bulb 67. A nut 68 serves to lock the socket 66 in place in the manner previously described. The socket 66 has associated therewith a slide switch actuator 69 for closing contacts located in the tubular member 65. Since this mechanism forms no part of the present invention it has not been illustrated in detail herein. Secured within the member 65 is a compound lens mount made up of a support 70 and a lens carrier 71. The member 70 is in the shape of a thick disc having an eccentric opening 72 communicating with a larger opening 73 concentric therewith. The shoulder formed by the union of these two openings serves as a seat for the carrier 71. This carrier 71 is in the form of an eccentrically bored tube, the bore of which is stepped to provide a seat for a lens 74. Two spaced slot 75 and 76 are provided in the wall of the member 65 and extend therearound through approximately 90 degrees. The respective parts 70 and 71 are provided with threaded stems 77 and 78 which extend through the slots 75 and 76 and are engaged by headed nuts 79 and 80 which are utilized for locking the members 70 and 71 in adjusted positions.

The upper end of the member 65 is of reduced diameter as indicated at 81 and is provided intermediate its length with a rounded boss 82. An internal shoulder 84 serves as a seat for a condensing lens 85. A light bending member or prism 86 is mounted on the top of the portion 81. The rounded portion 82 cooperates with parts 87 and 88 to form an adjustable ball joint similar to those described in the previous embodiment.

The top of housing 60 is provided with a boss 89 provided with an opening into which fits a round rod 90. A set screw 91 serves to lock this rod 90 in adjusted position. The rod 90 is attached to a tubular member 92 having a lens 94 mounted in one end thereof and held in place by a split spring ring 95 or by any other suitable means. A tube 96 is telescopically mounted in the tube 92 and has a lens 97 mounted in the enlarged end thereof. These two tubes 92 and 96 with their associated lenses form an adjustable inspection lens arrangement. If desired an insufflator attachment may be secured to the end of the housing 60 opposite to the speculum 64, such insufflator attachment comprising a member 98 having a part 99 of size to fit snugly within the end of the housing 60. A plain glass window 100 is cemented or otherwise secured in the member 98. An attachment nipple 101 extends through the wall of member 98 and has the end thereof enlarged for the reception of a flexible conduit leading to some suitable apparatus. The attachment 98 may be removed at any time access to the speculum for the passage of an instrument is desirable, or insufflation is not required.

The operation of the adjusting features of this form of the invention is substantially as follows: should the filament of bulb 67 be disposed off-center an amount sufficient to cause the axis of the light rays therefrom to vary from the desired line to any extent, compensation for such variation may be made by adjustment of the eccentric lens arrangement made up of the member 70 and the lens 74 carried by the member 71. Since each of the members 70 and 71 are capable of rotation through approximately 90 degrees, it follows that a substantial wide range of variations of positions of lens 74 can be employed. Therefore such adjustment may be made until the rays of light projected by the bending member or prism 86 are along the desired axis. Moreover, if desired the direction of the projected rays can be changed by adjustment of the entire member 65, including the mount 81, through the agency of the ball joint defined by the parts 82, 87 and 88. Either adjustment may be made independently of the other and the final adjustment may be secured as a result of cooperating adjustments of the two arrangements. It will be apparent moreover, that instruments may be made up incorporating either one of the two adjusting arrangements whereby one may be used to the exclusion of the other. Moreover, the provision of the adjustable inspection lens arrangement comprising the tubes 92 and 96 telescopically disposed and their associated lenses 94 and 97 permits a wide range of examination lens variations. Also since this inspection lens structure is mounted for pivotal movement it may be moved out of axial alignment with the speculum or to one side thereof, so that an operating instrument can be introduced through the speculum while inspection is employed at the same time.

In the modification of the invention shown in Fig. 7, 120 illustrates a fragment of a handle having a slot 121 therein, for the passage of a threaded stem 122 on the other end of arm 124. A nut 125 serves to lock these parts together. The arm 124 terminates in a split ball 126 held in a socket made up of parts 127 and 128 threaded together. The split ball can be made of such size that when placed in the socket sufficient friction will result to aid in proper adjustment of the parts. The part 127 is in effect a boss extending outwardly from a cylindrical member 129, in one end of which is mounted a socket 130 for a light bulb 131. This socket is adjustable longitudinally of the cylinder 129 and is held in adjusted position by means of a nut 132 similar to the nut 129 of Fig. 2. A slide switch 134 in the form of a sleeve serves to control energization of bulb 131. The top of cylinder 129 is partially closed but is provided with an aperture 135 across which is mounted in some suitable fashion a condensing lens 136. A prism 137 is mounted directly on top of the member 129.

A second member 138 in the form of a boss extends outwardly from the member 129 opposite to the member 127. Threadedly attached to member 138 is a second member 139; the parts 138 and 139 being shaped to form a socket for a ball 140. Ball 140 is formed on one end of a bent arm 141 attached to an adjustable inspection lens arrangement made up of telescopic tubes 142 and 144 and lenses 145 and 146 secured in these respective tubes. A speculum 150 can be secured to the handle 120 in the same fashion as the Fig. 2 construction.

In the use of this device the axis of the rays projected by the prism 137 can be accurately determined by adjustment of the ball joint connecting the member 129 to the handle 120. At the same time the inspection lens arrangement can be adjusted to permit observation of the part of anatomy under examination and also these parts may be adjusted in any desired fashion to permit proper illumination through the speculum, operation therethrough with a suitable instrument, and simultaneous inspection.

In the modification shown in Fig. 8 the instrument comprises an ophthalmoscope which for purposes of illustration has been shown as being made up of a casing 160 in which are mounted lens carrier discs 161 and 162. Extending outwardly from one surface of the casing 160 is an integral formation 164, having as part thereof a tube 165, in the upper end of which is mounted a prism 166. The lower end of the tube is externally threaded for the reception of a member 167 and this member 167 and the inner surface of tube 165 are shaped to form a socket for a ball-shaped termination 168 on the end of a lens mount tube 169. This tube 169 is shaped to accommodate two lenses 170 and 171 cemented or otherwise held in place. Below the lens 171 the member 169 is of enlarged diameter to receive an electric light socket 172 having a bulb 174 secured therein. This socket is adjustable in the manner described in previous embodiments of the invention.

In the use of this device as in all ophthalmoscopes it is desirable that the light rays projected by the prism 166 be in such direction as to be concentrated upon the eye of a patient being examined. Should the filament in bulb 174 be off-center to any extent, such condition can be compensated for by adjusting the member 169 relative to the member 165 through the adjustment of the ball joint before described. By such adjustment accuracy in the projection of light rays can be accomplished.

In Fig. 9 the invention has been shown as being combined in an instrument particularly adaptable for optical diagnostic work. In this form of the invention use is made of a tubular member 180 the lower end of which is internally threaded for the reception of external threads on an electric light socket 181 having a bulb 182 therein. Intermediate the ends of the member 180 is rotatably mounted an eccentrically bored member 182 having a lens 184 secured across the top of the eccentric opening. A threaded stem 185 extends outwardly through a slot 186 which is cut around the member 180 through approximately 90 degrees of its circumference. A nut 187 serves to lock the member 182 in adjusted position. A second member 188, having an eccentric bore 189, is mounted in member 180 above the member 182. This member 188 also has a lens 190 across the bore thereof. It also has a threaded stem 191 passing through a slot 192 similar to slot 186 and a nut 194 is utilized to lock the member 188 in position.

Secured to the top of the member 180 and extending at right angles thereto is a tubular member 200 having a plain glass window 201 secured thereacross. A small prism 202 is cemented to the inner surface of the window 201 and is positioned directly above a wall opening 204 in member 200, which wall opening is coaxial with the axis of member 180. Mounted across the bore of member 200 is a lens 205 and slidable within member 200 is a tube 206 having a lens 207 mounted in one end thereof. Proper adjustment of these telescopic parts with their associated lenses will serve to provide an inspection lens ararngement in which the dioptric variations of the combined lenses can be changed as desired.

Again an arrangement has been shown wherein any flash-light bulb can be used in the instrument even though the filament thereof may not be perfectly centered. An extreme illustration of an off-center filament has been shown in Fig. 9. Compensation may be made for such off-center position by adjusting the two members 182 and 188 until the rays passing through the lens 190 are directed through the opening 204 and strike the prism 202 at such point as to assure that the rays projected therefrom will be along the desired axis.

In Fig. 10, a still further arrangement has been shown for achieving the purposes of this invention to some extent. In this arrangement an end view of a speculum of modified construction is presented. The small orifice of the speculum is indicated at 210 while the larger end of such speculum has been shown as being defined by the walls 211 and 212 which serve to locate the speculum in a holder. It should be noted, however, that the orificed part of the speculum is off-center relative to the wall 211. Consequently when such wall 211 is engaged by the wall of a speculum holder the speculum can be rotated relative to the holder to vary the position of the small opening 210 therein. Such adjustment of the speculum may be made to permit the light rays from the light projecting member to be properly centered relative to the opening 210 and the speculum may be moved into such a position as to facilitate the use of operating instruments in conjunction therewith. This speculum obviously can be made in all desired sizes and can be used with any conventional diagnostic instrument embodying a speculum holder to receive a cylindrical portion of a speculum.

Figure 11:
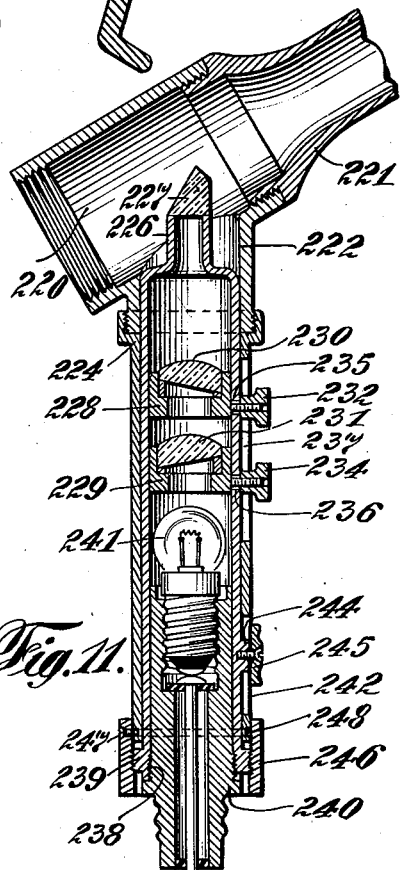
Fig. 11 is a fragmentary vertical section of a further modification.

In the embodiment shown in Fig. 11, 220 represents a housing somewhat similar to the housing 60 of the Fig. 4 arrangement. This housing is constructed for the reception of a speculum 221 and has an angular tubular extension 222 on which is secured a tubular member 224 with the internal wall thereof in alignment with the wall of the extension 222. Telescopically secured within the tubular member 224 is a second tube 225 having the upper end reduced as at 226 to provide a mount for a light bending member or prism 227. Rotatably mounted within the tube 225 are two lens mounts 228 and 229. The respective mounts 228 and 229 are orificed and have secured thereto lenses 230 and 231. These lenses are so ground as to direct rays at angles to the axes of the two mounts. The two mounts can be locked in place by nuts 232 and 234 in threaded engagement with rods extending from the mounts through openings 235 and 236 in tube 225. These openings can extend around the surface of this tube 225 through 90 degrees or through any other desired angle. At the same time the tubular member 224 is provided with a long opening 237 of such size and dimensions as to accommodate the locking rods 232 and 234 in any positions thereof.

The lower end of tube 225 is internally threaded as at 238 and an externally threaded shoulder 239 is positioned above the extreme end thereof. An elongated socket member 240 has external threads for engagement with the threads 238 to position the socket member 240 within the tube 225. The upper end of this member 240 is shaped and electrically wired to receive a bulb 241.

The member 224 is provided with a relatively narrow longitudinal slot 242 in which fits a boss 244 extending from the tube 225. A slide actuator 245 is secured to this boss. Cooperating with the slide actuator for causing longitudinal movement of tube 225 within the member 224 is a sleeve 246 internally threaded to engage the external threads of the shoulder 239. This sleeve 246 has a guide screw 247 passing therethrough with the end thereof engaging an annular slot 248 in the member 224.

The operation and use of this device is substantially as follows: with bulb 241 in place the two lens mounts 228 and 229 may be adjusted in a rotary manner and also longitudinally within the limits of the slots 235 and 236 to cause rays from the bulb to be projected by the prism 227 along the desired axis. In addition the prism 227 may be moved longitudinally relative to the member 224 to cause it to extend into the housing 220 to any desired extent suitable either for inspection or instrumentation. Such movement can be accomplished by actuating the slide member 245 simultaneously with rotation of the sleeve 246, which simultaneous actuation of the two parts will cause sliding movement of the tube 225 within the member 224. In this manner various adjustments of the instrument are made possible.

The arrangements shown herein in which use is made of prisms for bending or directly rays of light from flash-light or similar bulbs make possible the use of such bulbs in a practical manner in diagnostic instruments. Since the prisms can be made of relatively small size, it follows that their presence in the field of vision of associated specula is not as objectionable as the presence of a flash-light bulb with associated rays concentration means. Consequently, the source of light rays can be located outside of the field of vision of the speculum and the small prism located suitably within such field. Thus vision into the opening of the speculum is not substantially obscured and likewise such a prism does not interfere materially with instrumentation. Moreover, the light projection system may be position at the most convenient point or angle in relation to the operator or to operating instruments and still the angle of projected rays may be varied to compensate for any such movement of the light projecting system, thus permitting or affording a new degree of operating illumination or freedom. Still as another advantage, one speculum holder may be made to suffice for all styles and sizes of specula. As a still further novel feature the devices shown herein are capable of operation in such manner that the size of projected light beams may be varied at will. For example, suitable adjustment makes possible the provision of a small beam of maximum concentration at the objective ends of long small diameter specula, but with the same instrument adjustment may be made to increase the size of the beam so that the illuminated area will likewise be increased to permit illumination of the entire field when short specula of large diameter are employed.

The adjustments, before referred to, can easily be made in any form of the invention while the instrument theerof is in use, for example, while a part of the instrument is inserted in a body cavity. It is not necessary to disassemble the instrument at any stage of use. Consequently, a new degree of efficiency and versatility of use is acquired.

From the foregoing it will be seen that the present invention in all the illustrated forms provides instruments having incorporated therein adjusting mechanism capable of being used in a number of fashions. Adjustments may be made to compensate for dissymmetry in filament position in a flash-light or similar light bulb used for illumination and also adjustment may be made to permit proper illumination of a speculum and at the same time provide access thereto for the use of operating instruments. It is to be understood that other modifications can be made within the scope of the invention in view of which any limitations imposed thereupon are to be only those set forth in the following claims.

What is claimed is:

1. In a diagnostic instrument, a hollow housing for an electric light bulb, a bulb secured therein, a light bending member secured at the top of said housing, a lens intermediate said bulb and said bending member, said lens being adjustable to change its axis relative to the axis of said bulb thereby to vary the axis of light rays projected from said source by said bending member, and a member extending outside said housing and connected to said lens for adjusting said lens while the bulb is stationary inside the housing.

2. In a diagnostic instrument, a hollow housing for an electric light bulb, a bulb secured therein, a light bending member secured at the top of said housing, a lens intermediate said bulb and said bending member, said lens being mounted for rotation about the axis of said housing and about axes at angles to that of the housing to vary the axis at which light rays from a stationary bulb are directed by said rotatable lens to said light bending member and thereby to vary the angle of projection of such rays by the light bending rays, and a member extending outside said housing and connected to said lens for rotating said lens while the bulb is stationary inside the housing.

3. In a diagnostic instrument, a hollow housing for an electric light bulb, a bulb secured therein, a light bending member secured at the top of said housing, a lens arrangement between said bulb and said bending member, said lens arrangement being eccentrically mounted relative to the axis of said bulb and being rotatable to vary the axis of light rays projected from a stationary bulb by said bending member, and means extending outside said housing and connected to said lens arrangement for adjusting said lens arrangement while the bulb is stationary in said housing.

4. In a diagnostic instrument, a hollow casing one end of which forms a speculum holder, a hollow housing for an electric bulb, a bulb secured therein, the upper end of said housing providing a mount for a light bending member, a light bending member held by said mount, the mount portion of said housing and said light bending member extending into said casing, and a universal swivel joint connecting said mount portion to said casing for varying the position of said light bending member relative to said speculum holder.

5. In a diagnostic instrument, a hollow casing one end of which forms a speculum holder, a hollow housing for an electric bulb, a bulb secured therein, the upper end of said housing providing a mount for a light bending member, a light bending member held by said mount, the mount portion of said housing and said light bending member extending into said casing, a universal joint connecting said mount portion to said casing for varying the position of said light bending member relative to said speculum holder, and means between said bulb and said bending member for varying the axis of light rays projected from said bulb by said bending member.

6. In a diagnostic instrument, a speculum holder, a support for light projecting means secured to said holder, a speculum rotatable in said holder and being eccentrically constructed whereby the axis of the speculum can be varied relative to the holder.

7. A diagnostic instrument comprising a handle, the upper end of said handle being formed to provide a speculum holder, a light bulb carrier, an arm having one end attachable to and removable from said handle intermediate the ends of the handle to extend angularly therefrom, the other end of the arm being joined to said carrier, said carrier having a light bulb mounted therein and having a light bending member secured to the top thereof to direct the rays of light from said bulb outwardly relative to the carrier and toward said holder, said connection between said handle and said carrier being adjustable for adjusting the position of said light bending member relative to said speculum holder to and from a position registering with said speculum holder and to and from an out of the way point relative to said speculum holder, said connection having incorporated therewith means for locking said carrier in any selected position.

8. A diagnostic instrument comprising a handle, the upper end of said handle being formed to provide a speculum holder and being so inclined that the axis of a speculum held thereby extends upwardly and outwardly at an angle greater than 90° relative to the axis of the handle, a light bulb carrier, an arm having one end attachable to and removable from said handle intermediate the ends of the handle to extend angularly therefrom, the other end of the arm being joined to said carrier, said carrier having a light bulb mounted therein and having a light bending member secured to the top thereof to direct the rays of light from said bulb outwardly relative to the carrier and toward said holder, said connection between said handle and said carrier being adjustable for adjusting the position of said light bending member relative to said speculum holder to and from a position registering with said speculum holder and to and from an out of the way point relative to said speculum holder, said connection having incorporated therewith means for locking said carrier in any selected position.

9. In a diagnostic instrument, a handle, a speculum holder at the upper end of said handle, a tubular member having a source of light rays secured therewithin, a light bending member mounted above said source of light rays and positioned to direct rays of light toward a speculum held in said holder, a condensing lens positioned between said source of light rays and said light bending member, a spacing bar extending angularly from the handle intermediate the ends thereof, a stud extending from the tubular member, the ends of the spacing bar and the stud being joined by a joint permitting pivotal movement of the stud relative to the end of the bar to vary the relative angular positions between the holder and the light bending member thereby to compensate for differences in length and diameter of specula held by said holder, said tubular member being movable to position said light bending member in register with said speculum holder and to position said light bending member in an out of the way point relative to said speculum holder, said joint having incorporated therewith means for locking said tubular member in any selected position.

10. In a diagnostic instrument, a hollow housing for an electric light bulb, a light bulb secured therein against movement out of axial coincidence with said housing, a tubular mount for a light bending device, said mount being joined to said housing in alignment therewith, a light bending device mounted in said mount to direct rays of light from said bulb angularly relative to the axis of the housing, said mount and light bending device being movable as a unit relative to the axis of said bulb to cause the axes of said housing and of said mount to be out of coincidence and thereby to vary the direction of light rays projected by said light bending member.

11. In a diagnostic instrument, a hollow housing for an electric light bulb, a bulb secured therein against movement out of axial coincidence with said housing, a light bending member secured above the top of said housing for directing rays of light from said bulb outwardly angularly relative to the axis of the housing, and adjustable light transmitting means intermediate said bulb and said light bending member, said adjustable light transmitting means being rotatable while the bulb is stationary to vary the angle at which rays from the bulb contact the light bending member and thereby to vary the angle at which such rays are projected by the light bending member.

12. An endoscopic instrument of the class described, comprising an elongated tubular barrel axially open from end to end, illuminating means connected to one end of the barrel and selectively movable to and from a position registering with the barrel and to and from a position displaced to an out of the way point at one side at least of the barrel, and means for positively locking said illuminating means against movement when in each of its selective positions aforesaid.

13. An endoscopic instrument of the class described, comprising an elongated tubular barrel axially open from end to end, illuminating means connected to one end of the barrel and selectively movable to and from a position registering with the barrel and to and from a position displaced to an out of the way point at one side at least of the barrel, and means for locking said illuminating means against movement when in each of its selective positions aforesaid.

WALTER A. ARNESEN.